United States Patent [19]

Newton

[11] 4,315,432
[45] Feb. 16, 1982

[54] ENCLOSURE FOR PROTECTING INSTRUMENTS AGAINST ADVERSE ENVIRONMENTS

[76] Inventor: Roger A. Newton, 17835 Gebhardt Rd., Brookfield, Wis. 53005

[21] Appl. No.: 158,894

[22] Filed: Jun. 12, 1980

[51] Int. Cl.³ .......................... G01L 19/14; G01P 1/02
[52] U.S. Cl. ........................................ 73/431; 73/738; 73/756
[58] Field of Search .................. 73/431, 756, 738, 201

[56] References Cited

U.S. PATENT DOCUMENTS

| | | | |
|---|---|---|---|
| 3,895,296 | 7/1975 | Boyd et al. | 73/431 X |
| 3,938,393 | 2/1976 | Mogensen | 73/738 X |
| 4,061,032 | 12/1977 | Friebel | 73/431 X |
| 4,197,747 | 4/1980 | Koehler | 73/431 |
| 4,201,090 | 5/1980 | Davidson | 73/431 |

*Primary Examiner*—Daniel M. Yasich
*Attorney, Agent, or Firm*—Quarles and Brady

[57] ABSTRACT

A protective enclosure for an instrument comprising a pair of housings connected to a support ring. An external bracket for securing the enclosure to a mounting structure is attached to the outside of the support ring and an internal bracket for supporting an instrument inside the enclosure is attached to the inside of the support ring. Instrument lines, fluid or electrical, to and from the instrument lead through the support ring.

7 Claims, 11 Drawing Figures

ENCLOSURE FOR PROTECTING INSTRUMENTS AGAINST ADVERSE ENVIRONMENTS

TECHNICAL FIELD

This instrument relates to the protection of instruments against adverse environments so that the parameter being measured by the instruments can be determined without detrimental effects on the operability of the instrument or the accuracy of the signal being generated due to the adverse environment.

BACKGROUND ART

Instruments are used in numerous scientific and industrial applications to measure parameters of interest for the particular technology being employed. Various types of instruments are utilized to measure parameters such as fluid flow, pressure, level, temperature, velocity, acceleration, weight, mass, radiation level or humidity. Measurement of these parameters sometimes makes it necessary to locate the instrument in an environment which exposes it either continuously or intermittently to adverse environmental conditions, such as pressure, humidity, temperature, dust, abrasive particles, corrosive gas and/or radiation level. A known solution to this problem is to surround only the delicate parts of the instrument in a protective housing together with closure seals and other seals around electrical wires entering or leaving the housing; however, when instruments of this construction are tested in simulated adverse environments, they often fail or become unacceptably inaccurate. Another known solution is to install the principal portions of an instrument in a location remote from the parameter being measured so that they are in a more benign environment which the instrument can withstand. However, locating the instrument at a distance from the parameter under measurement has several disadvantages, including that the instrument can be less accurate for some type of measurements when positioned a substantial distance from the parameter being measured, and that the increased distance may add complexity to the instrument system. Another prior proposal to solve the problem involves placing instruments in protective containers that are bulky and provide extremely poor access to the instrument for normal activities such as calibration and maintenance. Consequently, a need exists for an enclosure structure that will protect instruments against adverse environments, having a relatively simple construction, and allow easy access to the instrument for calibration and maintenance.

DISCLOSURE OF THE INVENTION

My present invention provides a protective enclosure for instruments requiring environmental protection comprising three major components: a pair of housing elements and a support ring, wherein the two housing elements are joined to the support ring to form an enclosure surrounding the instrument. The support ring includes means on its exterior surface for mounting the enclosure to a fixed structure such as a wall and also includes means along its interior surface to which the instrument is attached. Further, all instrument line means, such as fluid lines and electrical conductors, leading to and from the instrument in the enclosure extend through the support ring to communicate with the interior of the enclosure. In order to form a leak-tight enclosure when necessary, sealing means are incorporated between the two housing elements and the support ring and leak-tight connections are made where the instrument line means enter or leave the support ring. The configuration of the enclosure can be adjusted as required to protect various types of instruments against adverse environmental conditions, and the new construction has numerous advantages which are discussed hereinafter.

BRIEF DESCRIPTION OF THE DRAWINGS

The following detailed description of this invention is made in reference to the accompanying drawings that illustrate several exemplary embodiments, in which.

BEST MODES FOR CARRYING OUT THE INVENTION

(A) FIGS. 1-3

Figure 1:
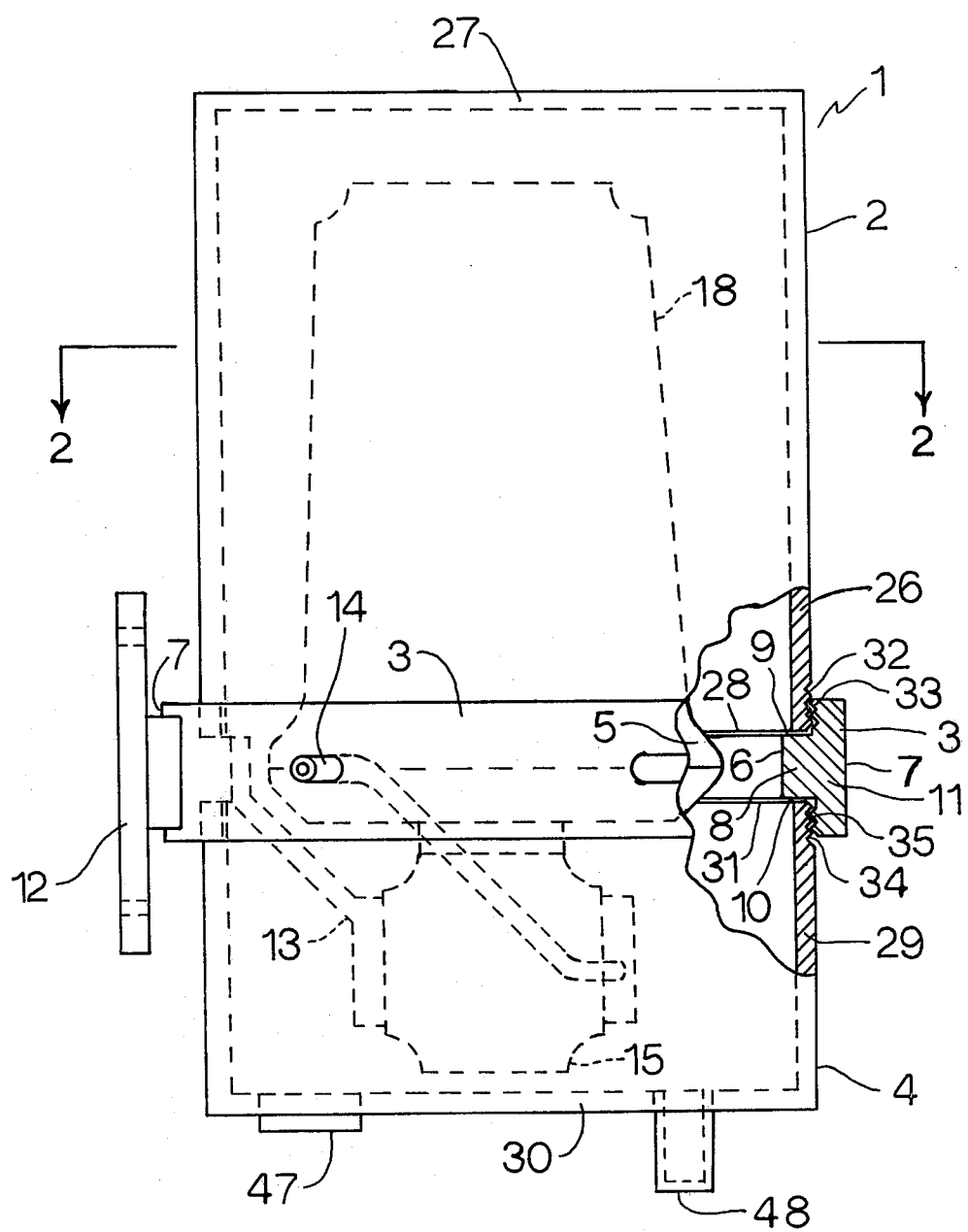
FIG. 1 is a side elevation, with a portion broken away, of an instrument enclosure constructed in accordance with the present invention.

FIG. 1 illustrates an instrument enclosure constructed in accordance with this invention, comprising a canister 1 formed of housing elements 2 and 4 joined to a support ring 3. In this first illustrated embodiment, the housing element 2 is an upper housing and the housing element 4 is a lower housing, although the housing elements can be positioned in a horizontal arrangement if desired. The canister forms a protective enclosure for an instrument 5 which is mounted inside the canister. The housing 2 and 4 and support ring 3 can be made of various materials; metal, such as steel or aluminum, would be used in most instances, but other materials such as molded plastic or reinforced plastic are also useful, with the material being selected that is best suited to the environment in which the canister will be placed and the nature of the instrument within the canister.

Figure 3:
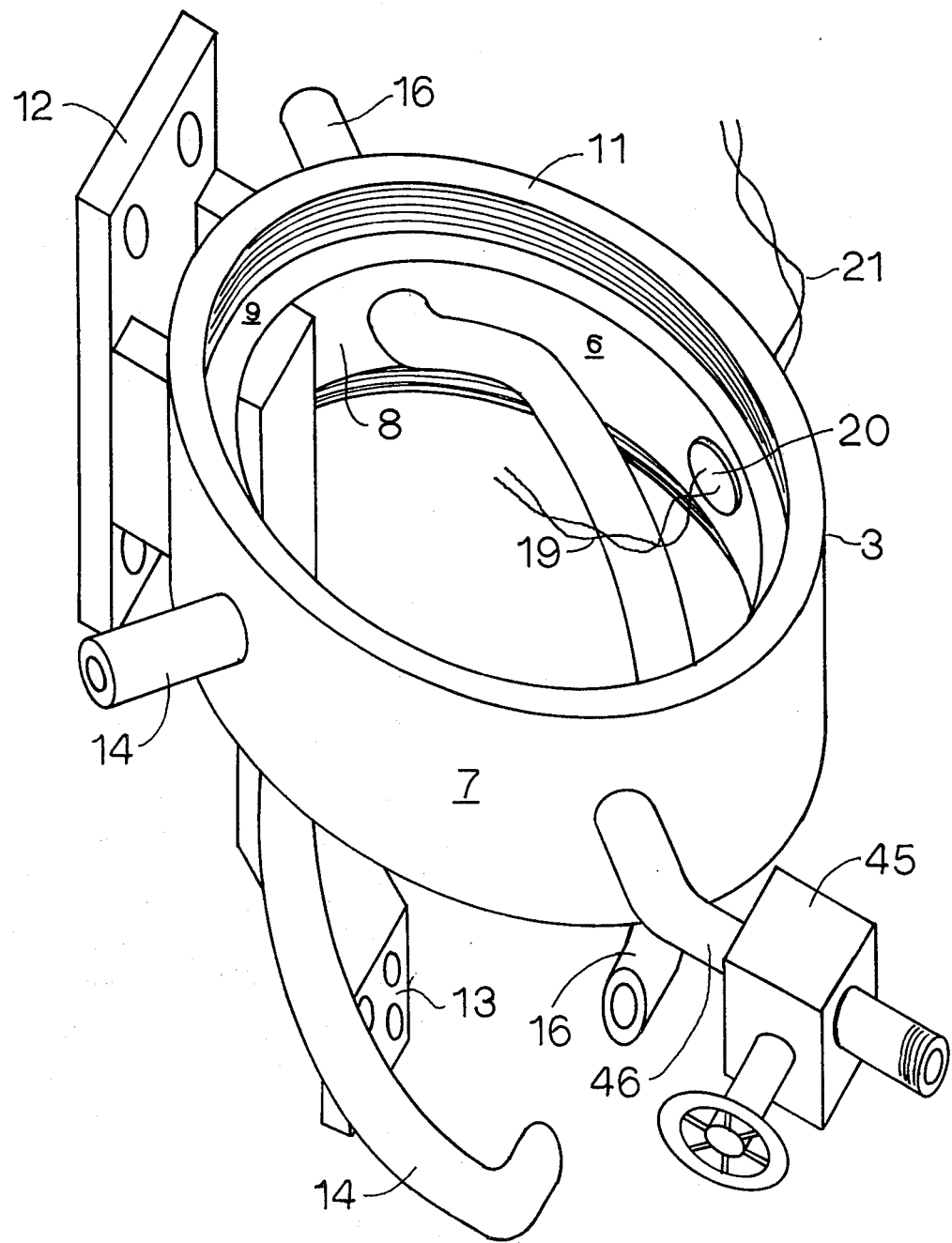
FIG. 3 is a perspective view of the support ring of the instrument enclosure shown in FIG. 1.

The support ring 3 is the main structural member of the canister. As best illustrated in FIGS. 1 and 3, the support ring 3 includes an inner wall 6 that opens onto the interior of the canister and an outer wall 7 that is arranged exteriorly of the canister. The support ring 3 is desirably made of a generally T-shape form wherein the inner wall 6 forms part of an inner annular portion 8, having spaced upper and lower radial walls 9 and 10, that is connected to an outer annular portion 11 which extends above and below the inner portion 8 in an axial direction. The outer wall 7 forms an exterior wall surface of the annular portion 11.

An outer mounting bracket 12 is attached to the outer wall 7 of the support ring 3 to provide mounting means for securing the canister to a suitable mounting structure such as a wall, tank, pipe, etc. An inner mounting bracket 13 is attached to the inner wall 6 of the support ring so as to be positioned inside the canister and provide a means for mounting an instrument within the canister. The instrument 5 is attached to the inner mounting bracket 13 by any suitable fasteners, such as bolts, etc.

The instrument 5 shown inside the canister is a Foxboro Model 613 DM Differential Pressure Transmitter and is illustrated as being arranged to measure liquid level in a tank. A liquid line, not shown, leads from the top of the tank in which liquid level is being measured to a fluid conduit 14 that extends through the support ring 3 and is connected to one side of a diaphragm capsule 15 which is part of the instrument 5. Another liquid line, also not shown, leads from the bottom of the tank in which liquid level is being measured to a fluid conduit 16 which extends through the support ring 3 and is connected to the opposite side of the diaphragm capsule 15. The fluid conduits 14 and 16 both extend through the inner wall 6 of the support ring 3. Any difference between the liquid pressures within the conduits 14 and 16 exerts a force on the diaphragm capsule which is translated to mechanical movement of the armature of a differential transformer 17 (FIG. 2) that is located inside instrument housing 18. The change in electrical characteristics of the differential transformer 17 is proportional to changes in the differential pressure exerted upon the diaphragm capsule 15, so that measurement of this change provides an indication of the liquid level in the tank to which the instrument is connected. Electrical wires 19 from the transformer 17 lead to an electrical penetration 20 that extends through the support ring 3. On the outside of the canister, additional electrical leads 21 extend from the penetration 20 to the desired instrument signal processing module. Thus, all the instrument line means associated with the instrument 5, herein illustrated as comprising fluid and electrical lines, extend through the support ring 3 of the canister.

The housing element 2 is illustrated as an openended cylinder having a cylindrical sidewall 26, a top wall 27 closing one end of the housing and an open end 28; similarly, the housing element 4 is shown as having a cylindrical sidewall 29, a bottom wall 30 closing one end of the housing and an open end 31. The housing element 2 is joined to the support ring 3 along threads 32 formed about its open end which mate with threads 33 formed in part of the outer annular portion 11 of the support ring; the housing 4 is joined to the support ring 3 along threads 34 formed about its open end which mate with threads 35 formed in an opposite portion of the annular portion 11 of the support ring. The open end 28 of the housing 2 contacts the radial wall 9 of the inner annular portion of the support ring and the open end 31 of the housing 4 contacts the radial wall 10 of the support ring to establish a leak-tight barrier therewith. When the canister 1 is made of metal elements, this engagement forms a hard metal-to-metal sealing engagement of the two housings with the support ring. If desired, a soft seal arrangement can also be used wherein a gasket or O-ring seal of suitable material is inserted between the open end of each housing and its respective contacting portion of the support ring.

Figure 2:
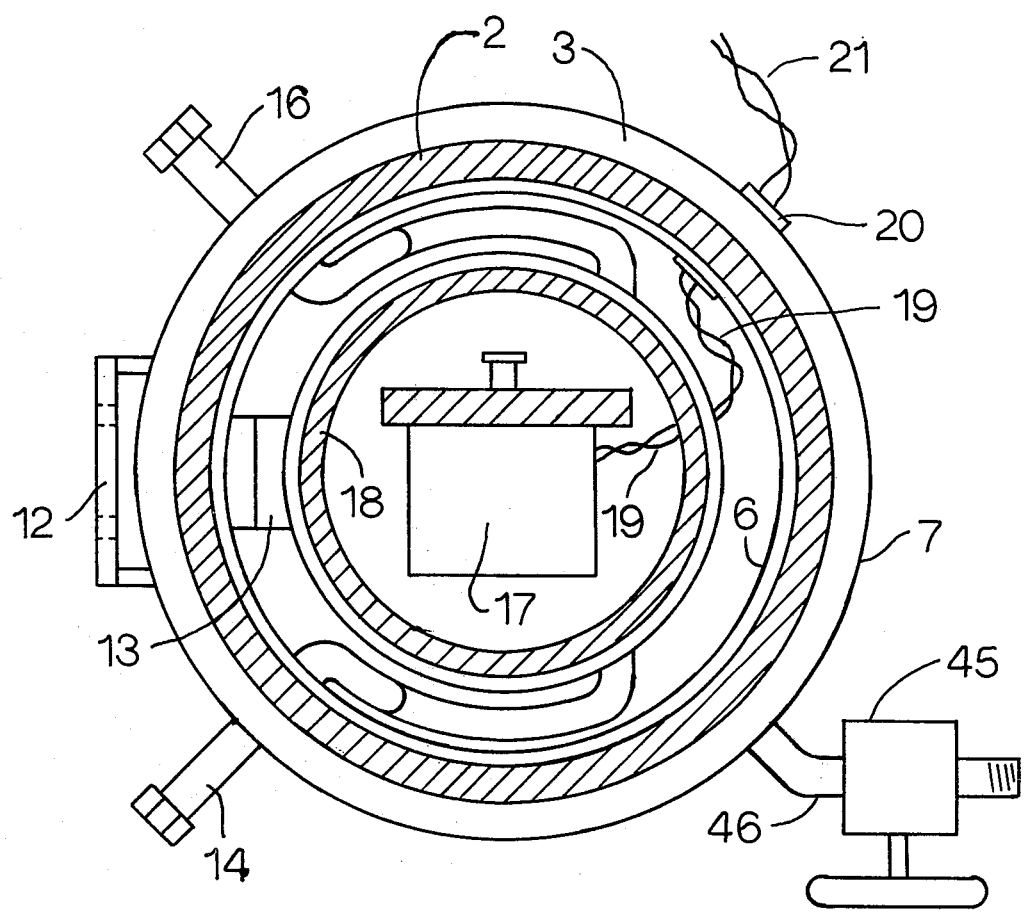
FIG. 2 is a horizontal sectional view taken along the plane of line 2—2 of FIG. 1.
Figure 2A:
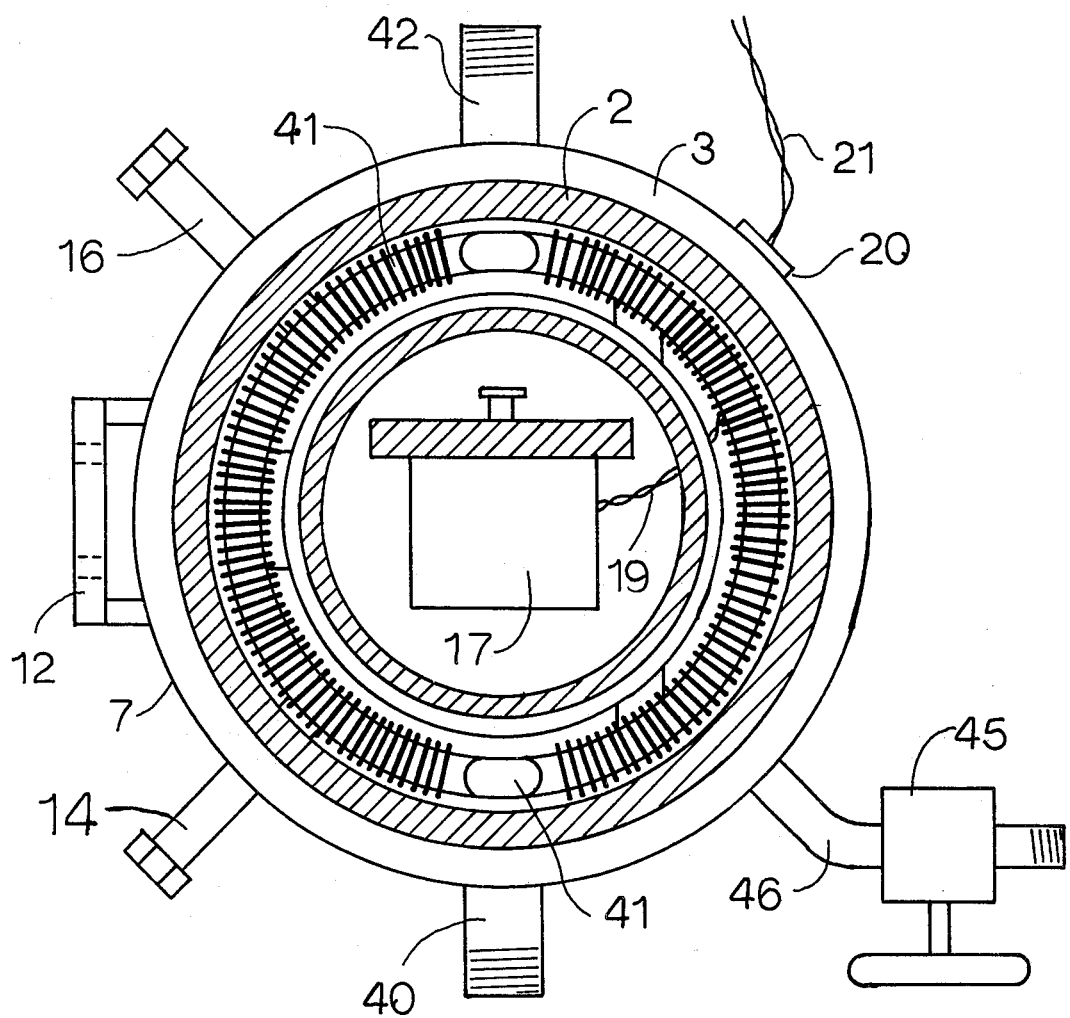
FIG. 2A is a horizontal sectional view similar to FIG. 2 showing an instrument enclosure with an internal cooling coil.

The canister 1 as illustrated in FIGS. 1-3 may incorporate four optional items that can be used depending upon the requirements of the particular instrument positioned inside the canister:

(1) As shown in FIGS. 2A, if a sustained high temperature environmental condition exists which exceeds the natural insulating capability of the barrier provided by the canister, cooling water can enter through inlet conduit 40, circulate through a finned cooling coil 41, and leave the canister through an outlet conduit 42. The inlet and outlet conduits 40 and 42 each extend through the support ring 3 and are welded or otherwise attached thereto so as to form a leak-tight connection. The cooling coil can be arranged about the interior of the support ring as illustrated, which enables access to the instrument 5 without disconnecting the cooling coil, or it can be located in either one or both of the housings 2 or 4 which would often require that the cooling coil be disconnected when a housing is removed.

(2) It may be desirable to control the pressure inside the canister. A valve 45 of any suitable type is connected to a gas line 46 that extends through the support ring 3, so as to communicate with the interior of the canister 1. The valve 45 can be connected to a source of high pressure air or other suitable gas or to a vacuum pump system, not shown. The gas line 46 is provided with a leak-tight barrier connection where it extends through the support ring 3. Depending upon the specific instrument, the canister can be pressurized and operated with a selected internal pressure through the valve 45 and line 46, or the canister can be evacuated and operated with a vacuum through the same valve and line; also, the pressure inside the canister can be equalized with the outside pressure prior to disassembly of the canister by actuation of the valve 45. Valve 45 and line 46 can be used to test the integrity of the canister 1 for leak tightness by pressurizing the interior of the canister and monitoring the pressure for a period of time; a decrease in pressure indicates that the canister is leaking. Other methods of leakage testing also may be employed.

(3) The canister can be protected against high internal pressure by incorporating a rupture disc 47 in one or both of the housing elements that is designed to break when the pressure limit is reached.

(4) If desired, a visual leakage indicator 48 can be attached to either or both of the housing elements so as to provide a visual indication of an internal leak when it occurs in the canister.

The canister 1 as described in connection with FIGS. 1-3 includes a pair of housing elements connected to a support ring wherein means for attaching the canister to a suitable mounting structure is carried on an outer wall of the support ring and mounting means for supporting an instrument inside the canister is carried on an inner wall of the support ring. Fluid conduits as required for the particular instrument within the canister lead through the support ring and appropriate fluid-tight connections are made between the juncture of the support ring and such conduits. Electrical leads to and from the instrument as required also extend through the support ring and appropriate fluid-tight connecting means are interposed therebetween as required. This combination of a support ring and housing elements, with instrument line means extending through the support ring, provides a protective enclosure for an instrument which can be readily assembled and disassembled so as to facilitate installation and maintenance of the instrument and which also can be maintained with appropriate fluid-tight integrity as required for a specific installation. The instrument line means may be a combination of fluid conduits and electrical connections or solely fluid conduits or electrical connections, as may be required for the instrument to be supported within the enclosure. Also, the instrument and its associated fluid systems can be completely connected and operated before the canister is assembled, thereby allowing a good visual check to be made for leaks in the internal connections prior to final assembly of the canister.

(B) FIGS. 4–6

Figure 4:
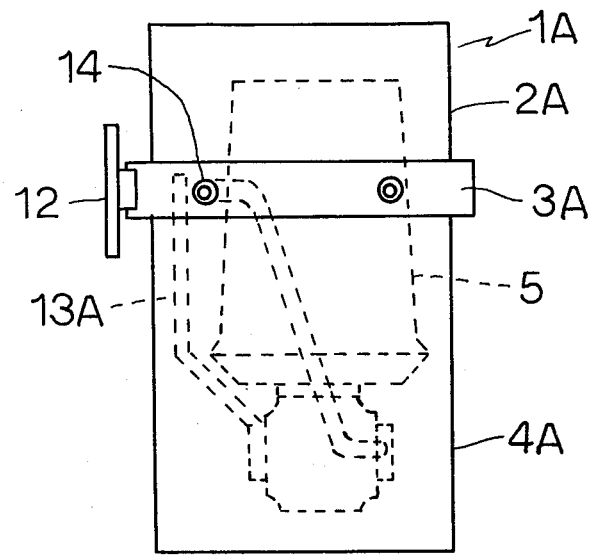
FIG. 4 is a side elevation of a second embodiment showing the instrument enclosure with a low mounted instrument.

The location of the instrument within the canister is dependent upon the type of instrument, its style and its access requirements. Variations in the instrument position can easily be accommodated by changing the diameter of the canister or by varying the height of the housing element 2 or the depth of the housing element 4. FIG. 4 shows a low mounted instrument 5 in a canister 1A having a short upper housing element 2A and a deep lower housing element 4A. The support ring 3A and inner mounting bracket 13A are modified as necessary to locate the instrument at the desired lower position.

Figure 5:
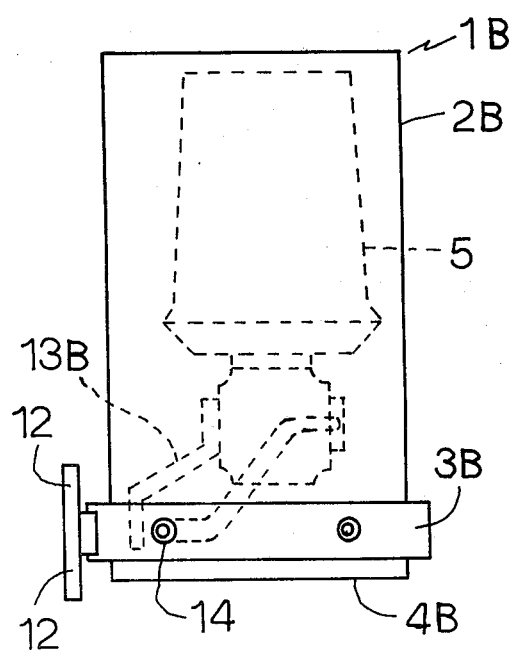
FIG. 5 is a side elevation of a third embodiment showing the instrument enclosure with a very high mounted instrument.

FIG. 5 shows a very high mounted instrument 5 in a canister 1B with a tall upper housing element 2B and a lower housing element 4B which is a cover plate. The lower housing 4B can be permanently fastened to the support ring 3B or can be removably attached as by threads. The support ring 3B and the inner mounting bracket 13B are designed to locate the instrument 5 at an elevated position.

Figure 6:
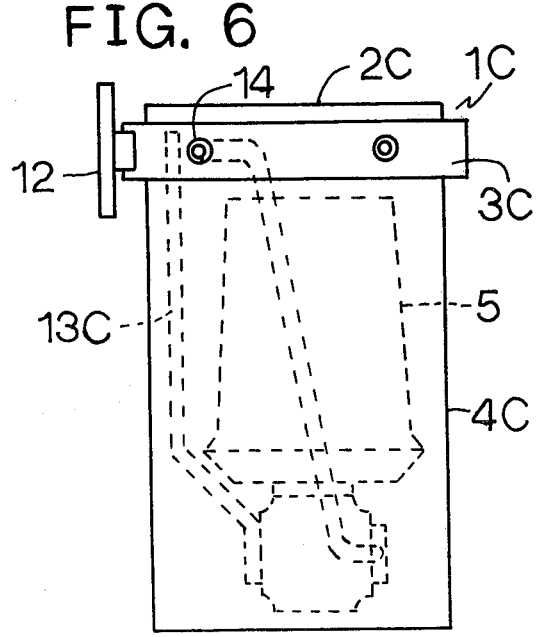
FIG. 6 is a side elevation of a fourth embodiment showing the instrument enclosure with a very low mounted instrument.

FIG. 6 shows a very low mounted instrument 5 in a canister 1C having a very deep lower housing element 4C and an upper housing element 2C which is a cover plate. The upper housing element 2C can be permanently fastened to the support ring 3C or it can be removably attached as by threads. The support ring 3C and the inner mounting bracket 13C are designed to locate the instrument 5 at the desired low position. Any position of the instrument between the very high position of FIG. 5 and a very low position of FIG. 6 is possible.

(C) FIG. 7

Figure 7:
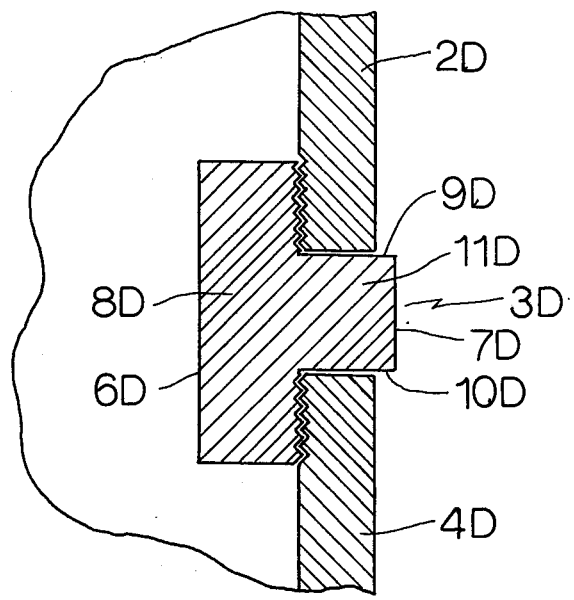
FIG. 7 is a vertical sectional view showing an alternative support ring structure for an instrument enclosure of this invention.

FIG. 7 illustrates an alternate cross-sectional shape for the support ring. Support ring 3D has an inner annular portion 8D that is larger in the axial direction of the canister than the outer annular portion 11D and the inner wall 6D is therefore larger than the outer wall 7D. The outer annular portion 11D includes spaced upper and lower radial walls 9D and 10D, respectively, which are engaged by the open ends of the housing elements 2D and 4D, respectively, to form the desired sealing contact therebetween.

(D) FIG. 8

Figure 8:
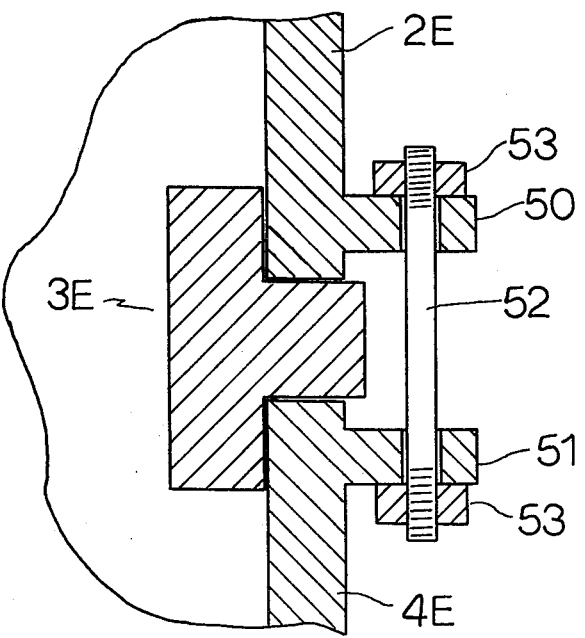
FIG. 8 is a vertical sectional view of another fastening and seal arrangement for an instrument enclosure of this invention.

An alternative connection between the housing elements and the support ring is shown in FIG. 8. The upper housing element 2E has an outwardly-turned circumferential flange 50 about its open end and the lower housing 4E has a similar flange 51 extending about its open end. The support ring 3E is similar in cross section to support ring 3D of FIG. 7 except that it is not threaded. The housing element 2E and housing element 4E are fastened to support ring 3E by a plurality of bolts 52 and nuts 53 equally spaced about the flanges 50 and 51, with the open end of each housing element contacting the support ring. Other means for fastening the housing elements to the support ring can be utilized, such as machine screws, swing bolts and nuts or mechanical clamps. It is generally useful that the sealing means between the housing elements and the support ring is independent of the means for fastening the housing elements to the support ring.

Figure 9:
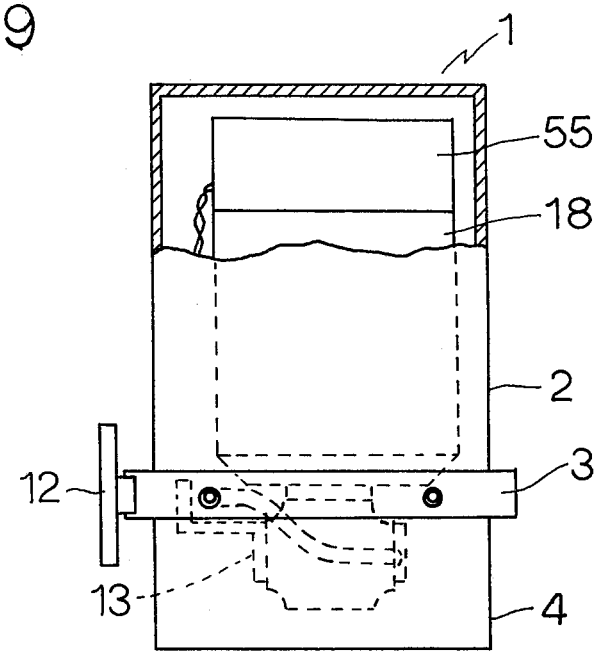
FIG. 9 is a side elevation, with a portion broken away, illustrating the present enclosure with an instrument incorporating a radiation shield.
Figure 10:
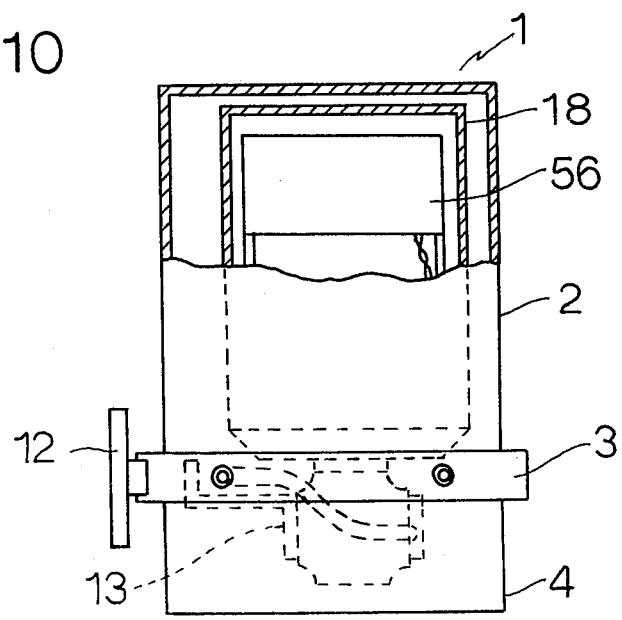
FIG. 10 is a view similar to FIG. 9 showing another arrangement of a radiation shield in connection with an instrument supported in an instrument enclosure of this invention.

(E) FIGS. 9 and 10

Instruments may be located in a high radiation area and require protection from that adverse environment. The canister 1 can be sized to provide the space necessary to accommodate a radiation shield for sensitive components, this shield usually being made of 1-3" of lead or a similar high density material. The sensitive component of most instruments is a small amplifier located inside the instrument housing. The amplifier can be mounted within a radiation shield and the shield made small enough in size to fit inside the canister. FIG. 9 shows an upper arrangement whereby a radiation shield 55 is mounted on top of a modified instrument housing 18. FIG. 10 shows an inner shield arrangement in which a radiation shield 56 is mounted inside another modified instrument housing 18. The housing elements 2 and 4, support ring 3 and the inner mounting bracket 13 are sized to accommodate the size and weight requirements of the instrument. A radiation shield can be placed at any desired location within the canister 1.

INDUSTRIAL APPLICABILITY

There has thus been described a protective enclosure for instruments which is capable of protecting instruments against various types of adverse environments. The new protective enclosure comprises a pair of housing elements, or first and second housing elements, detachably joined to a support ring wherein the support ring includes means attached to its exterior wall surface for supporting the enclosure on a suitable rigid surface, and mounting means on its interior wall surface for supporting an instrument inside the enclosure. The housing elements are detachably joined to the support ring, such as by a threaded connection or clamps, so that either housing element can be readily separated from the support ring when it is desired to install the instrument, check connections, calibrate the instrument, and other functions associated with the maintenance of an instrument in proper operating condition. Instrument line means, fluid or electrical to and from the instrument, extend through the support ring and the junction between any such lines and the support ring can be made fluid-tight as necessary in order to prevent leakage. The instrument enclosure described herein can be used to protect an instrument from an adverse environment, or it can be used to provide a controlled environment within the enclosure for a specific instrument.

Although the instrument 5 illustrated in the drawings is a Foxboro Model 613DM Differential Pressure Transmitter, other models of Foxboro instruments and instruments made by other manufacturers such as ITT Barton, Bailey Instruments Inc., Rosemount Inc., Fischer and Porter Co., Westinghouse Electric Corporation, etc. can be mounted inside the enclosure. The instrument 5 as illustrated herein is being used to measure liquid level; other desired parameters, such as fluid and electrical or both, can be measured, however, such as fluid flow, pressure, temperature, velocity, acceleration, weight, mass, radiation level, humidity, etc. The parameter to be measured by the instrument may be electromagnetic, physical, fluid or electrical in nature, and the present instrument enclosure is capable of broad applicability in various industrial uses. For example, instruments using a thermocouple to measure temperature are widely-used. All thermocouples have two junctions of dissimilar wires, a hot or measuring junction and a cold or reference junction. The reference junction in some instruments consists of the two dissimilar wires connected to cooper wires which are in turn connected to a measuring device. The temperature of the reference junction must be measured in order to determine the temperature at the measuring junction. A resistance temperature detector is generally used to measure the temperature at the reference junction, and the detector can be enclosed within a protective enclosure such as the canister 1 described above with the electrical leads from and to the reference junction extending through the support ring of the enclosure through suitable electrical penetration means extending through the support ring, and such connections can be made fluid-tight if required. Other services required to measure and control the temperature of the reference junction can also penetrate the enclosure through the support ring. Thus, in this use of the protective enclosure of this invention, the instrument line means will comprise only electrical lines, without any fluid conduits.

As described above, provision can also be made for cooling the interior of the enclosure by either liquid or gas, and connections to and from a suitable cooling coil arranged inside the enclosure are made through the support ring. Pressure inside the enclosure can be controlled either above or below ambient pressure through the air line and isolation valve disclosed above, and the air line also extends through the support ring in a fluid-tight connection; this feature allows the interior pressure of the enclosure to be equalized with the ambient pressure prior to any disassembly.

The new instrument enclosure described herein has a number of important advantages which result in its wide industrial applicability. All instrument line means, such as fluid or electrical connections to the instrument within the enclosure, can remain intact when the enclosure is disassembled for calibration of the instrument because all such connections go through the support ring. Each housing element is detachable from the support ring to permit the facile disassembly of the enclosure as required. Also, the enclosure can be made relatively compact if this is a consideration in a particular installation. As described above, provision can be made to include radiation shielding of sensitive components of an instrument supported within the enclosure. The present enclosure is further advantageous in that it can be readily utilized with existing instruments with very little modification to the instrument itself, to thereby protect them against adverse environments; thus the enclosure can be readily adapted for use with both existing and new instrumentation. Further, the construction of the enclosure as herein described allows for an instrument and its associated fluid or electrical systems to be completely connected and operated on a trial basis before the enclosure is fully assembled; this enables a good visual check to be made of any internal fittings for leakage before assembly is completed. If required for a specific instrument, protection against high internal pressure can be incorporated with the enclosure by utilizing a rupture disc in one or both of the housing elements of the enclosure, and provision can also be made for a visual leakage indicator to allow for detection of an internal leak. Thus the present enclosure can be utilized to protect any type of instrumentation against adverse environmental conditions. While the foregoing description sets forth various illustrative embodiments of the present invention, it is anticipated that those skilled in the art will be able to devise changes to the disclosed embodiments and also new embodiments that will remain with the technical spirit and scope of this invention.

I claim:

1. A protective enclosure for an instrument of the type used for measuring an electromagnetic, physical, fluid or electrical parameter comprising the combination of:

first and second housing elements and a support ring, each housing element being detachably joined to the support ring to define a protective enclosure;

the support ring having an inner wall sealingly mounted between each of said first and second housing elements and opening onto the interior of the protective enclosure and an outer wall positioned exteriorly thereof;

mounting means attached to a portion of the inner wall of the support ring for supporting an instrument inside the enclosure;

means attached to the outer wall of the support ring for supporting the enclosure on a rigid surface; and plural instrument line means sealingly extending through the support ring for connection with an instrument inside the enclosure.

2. A protective enclosure according to claim 1 wherein:

each said housing element has an open end, and each said open end is detachably joined to opposite sides of the support ring along mating threads.

3. A protective enclosure according to claim 1, wherein:

each housing element has an open end contacting the support ring and an outwardly turned circumferential flange extending about the open end, and fastening means extending through the circumferential flange of each housing element to detachably join them to the support ring.

4. A protective enclosure according to claims 1, 2 or 3 wherein:

the instrument line means are fluid lines extending through the support ring.

5. A protective enclosure according to claims 1, 2 or 3 wherein:

the instrument line means are electrical lines extending through the support ring.

6. A protective enclosure according to claims 1, 2 or 3 wherein:

the instrument line means are fluid and electrical lines extending through the support ring.

7. A protective enclosure according to claims 1, 2 or 3 further including:
a cooling coil arranged for cooling an instrument inside the protective enclosure, an inlet conduit extending through the support ring for cooling fluid to enter into the cooling coil, and an outlet conduit extending through the support ring for cooling fluid to leave the cooling coil, there being a leak-tight connection between the inlet and outlet conduits and the support ring.

* * * * *